United States Patent
Bao et al.

(10) Patent No.: US 8,544,415 B2
(45) Date of Patent: Oct. 1, 2013

(54) BREEDING METHOD FOR ORANGE-ADDUCTOR-MUSCLE SCALLOP

(75) Inventors: Zhenmin Bao, Qingdao (CN); Shan Wang, Qingdao (CN); Ning Li, Qingdao (CN); Jingjie Hu, Qingdao (CN); Rui Hou, Qingdao (CN); Xiaoliang Ren, Qingdao (CN); Xiaoli Hu, Qingdao (CN); Wei Lu, Qingdao (CN)

(73) Assignee: Ocean University of China, Qingdao, Shandong (CN)

( * ) Notice: Subject to any disclaimer, the term of this patent is extended or adjusted under 35 U.S.C. 154(b) by 276 days.

(21) Appl. No.: 13/257,746

(22) PCT Filed: Jun. 12, 2010

(86) PCT No.: PCT/CN2010/073861
§ 371 (c)(1),
(2), (4) Date: Sep. 20, 2011

(87) PCT Pub. No.: WO2011/066738
PCT Pub. Date: Jun. 9, 2011

(65) Prior Publication Data
US 2012/0006278 A1    Jan. 12, 2012

(30) Foreign Application Priority Data
Dec. 3, 2009 (CN) .......................... 2009 1 0231570

(51) Int. Cl.
*A01K 61/00* (2006.01)
(52) U.S. Cl.
USPC .......................................... 119/236; 119/234
(58) Field of Classification Search
USPC ................................................ 119/234, 236
See application file for complete search history.

(56) References Cited

U.S. PATENT DOCUMENTS
7,320,293 B2 * 1/2008 Zhang et al. .................. 119/234

FOREIGN PATENT DOCUMENTS
CN  101103709 A  1/2008
CN  101720705 A  6/2010

OTHER PUBLICATIONS

International Search Report (PCT/ISA/210) issued on Sep. 23, 2010, by Chinese Patent Office as the International Searching Authority for International Application No. PCT/CN2010/073861.

* cited by examiner

*Primary Examiner* — Kristen C Hayes
(74) *Attorney, Agent, or Firm* — Buchanan Ingersoll & Rooney PC

(57) ABSTRACT

The present invention relates to a method in the field of shellfish breeding techniques, for breeding a scallop population that have improved carotenoid content in the orange-red adductor muscles or other muscle tissues. This method includes the steps of selecting the rare individuals that have orange-red adductor muscles from natural scallop populations, growing the selected scallops, inducing the reproduction, artificially fertilization, and finally breeding a scallop population with orange-red adductor muscles which can be expanded for the cultivation on a large scale. Comparing to other known breeding methods, the present method does not use transgenic technologies to include introduce any exogenous genes, thus does not have any bio-safety and ethics issues. All the mutant scallops with orange-red adductor muscles are selected from natural or cultivated populations. After breeding for four generations, the obtained scallops have abundant carotenoid ingredients in their orange-red adductor muscles. The obtained scallop population is genetically stable and has high survival rate, and it thus can be used for cultivation on a large scale. In summary, this breeding method is simple, low cost and the breeding scallop population has high economic and nutritious values.

1 Claim, No Drawings

BREEDING METHOD FOR ORANGE-ADDUCTOR-MUSCLE SCALLOP

FIELD OF THE INVENTION

The present invention discloses a method in the field of shellfish breeding techniques and breeds a scallop population with abundant carotenoid content in the orange-red adductor muscle or other muscle tissues.

BACKGROUND OF THE INVENTION

During the process of selective breeding for scallops, it has been found that very few individuals (<0.1%) in wild scallop populations have orange-red adductor muscles other than normal while adductor muscles. However, the mutation of the adductor muscle color hasn't been reported before. By analyzing ingredients and further determination of molecular structure identity, two carotenoid ingredients, the pectenolone and pectenoxanthin are found to attribute to the orange-red color of the adductor muscle in the scallop. As essential amino acids, carotenoids have multiple biological functions, but they can't be synthesized by the human body and must be acquired from diet. So abundant carotenoids in the adductor muscle can significantly improve the nutritious value of the scallop, at the same time, the orange-red color can make the appearance of dishes more attractive.

During the breeding process, the scallops with orange-red adductor muscles were found to have faster growing rates and higher survival rates comparing to the ordinary scallops with white adductor muscles. The stress tolerant scallops with orange-red adductor muscles are genetically stable and can be largely applied to the commercial cultivation.

Up to date, the main methods to breeding new marine or land agricultural species is through hybridization or selective breeding according to different purposes. These methods depend on the genetic variation property of organisms. No method has been reported to use scallops with orange-red adductor muscles to selectively breed a new scallop population with high growing rate, survival rate and stress tolerance.

DETAILED DESCRIPTION OF THE INVENTION

The present invention mainly aims to develop a method to selectively breed scallops with orange-red adductor muscles through the seeds selecting, growing, inducing the reproduction, inseminating, and breeding steps.

To achieve this objective, this invention includes the steps of selecting the rare individuals that have orange-red adductor muscles from natural scallop populations, growing the selected scallops, inducing the reproduction, artificially fertilization, and finally breeding a scallop population with high growing rate, survival rate and stress tolerance. The scallop population with orange-red adductor muscles can be expanded for the cultivation on a large scale. We describe our method as follows:

(1) Randomly collecting adult scallops from wild scallop populations; slightly opening the shells, observing the colors of adductor muscles; selecting and growing the scallops that have orange-red adductor muscles; separating the male and female scallops; promoting the selected scallops to sexual maturity.

(2) Using the high performance liquid chromatography (HPLC) method to detect the carotenoid contents in the orange-red adductor muscles of selected scallops from (1); selecting the male and female scallops with above 15 µg/g carotenoid contents as breeding parents.

(3) Repeating the steps of (1) and (2) for four generations until 100% of the breeding scallops have stable carotenoid contents and the average carotenoid content of two year old scallops is above 30 µg/g.

(4) Then collecting scallops having orange-red adductor muscles from cultivated scallop populations or wild scallop populations; opening the shells and observing the appearance of sex glands; selecting the scallops with well-developed sex glands as breeding parents.

(5) Putting the selected scallops of (4) in the indoor culturing pools with filtered sea water; washing the shells of scallops to remove the additive mud and other materials; gradually and slowly increase the culturing temperature with less than 1□ increase every day until the culturing temperature is 8-8.5□ higher than environmental sea water temperature; culturing these scallop for additional 20 days to induce the sexual maturity.

(6) Separating the males and females of sexually matured breeding parents of (5); drying the scallops in the dark for 30-40 minutes; inducing the breeding parents to spawn eggs and sperms using warmer filter sea water which is 2□ higher than culturing sea water temperature of (5); separately collecting the eggs and sperms.

(7) Mixing the eggs with sperms; observing fertilized eggs under the microscope, each egg should be surrounded by 3-4 sperms; the fertilization should be finished within 1.5 hour.

(8) Incubating and growing the fertilized eggs of (7) according to normal cultivation methods; the breeding scallop population with orange-red adductor muscle can be commercially used for cultivation on a large scale.

Comparing to other known breeding methods, the present method does not use transgenic technologies to introduce any exogenous genes, thus does not have any bio-safety and ethics issues. All the scallops with orange-red adductor muscles are selected from natural or cultivated populations. After breeding for four generations, the obtained scallops have abundant carotenoid ingredients in their orange-red adductor muscles. The obtained scallop population is genetically stable and has high survival rate, thus can be used for cultivation on a large scale. In summary, this breeding method is simple, low cost and the breeding scallop population has high economic and nutritious values.

The invention is now illustrated in the following example.

Example 1

We perform our method through the following steps:

(1) Randomly collecting 1300 Yesso scallops (*Patinopecten yessoensis*) from wild Yesso populations in Rongcheng (Shandong Province, China); slightly opening the shells, observing the colors of adductor muscles; selecting and growing the scallops that have orange-red adductor muscles; separating the male and female scallops; promoting the selected scallops to sexual maturity.

(2) Using high performance liquid chromatography (HPLC) method to detect the pectenolone and pectenoxanthin contents in the orange-red adductor muscles of several scallops of (1); selecting several male and female scallops with above 15 µg/g pectenolone and pectenoxanthin contents as reference models; according to the colour of adductor muscles of reference models, selecting male and female scallops with adductor muscles showing redder colour as breeding parents.

(3) Growing the breeding parents of (2) to adult scallops using the raft culturing method; repeating the steps of (1) and (2) for four generations until 100% of the breeding scallops have stable carotenoid contents and the average carotenoid content of two year old scallops is above 30 μg/g.

(4) Collecting the *P. yessoensis* scallops having orange-red adductor muscles from cultivated scallop populations or wild scallop populations; opening the shells and observing the appearance of sex glands; selecting the scallops with well-developed sex glands as breeding parents.

(5) Putting the selected scallop of (4) in the indoor culturing pools with filtered sea water; washing the shells of scallops to remove the additive mud and other materials; gradually and slowly increase the culturing temperature with less than 1☐ increase every day until the culturing temperature is 8-8.5☐ higher than environmental sea water temperature; culturing these scallops for additional 20 days to induce the sexual maturity.

(6) Separating the males and females of sexually matured breeding parents of (5); drying the scallops in the dark for 30-40 minutes; inducing the breeding parents to spawn eggs and sperms using warmer filter sea water which is 2☐ higher than culturing sea water temperature of (5); separately collecting the eggs and sperms.

(7) Mixing the eggs with sperms; observing fertilized eggs under the microscope, each egg should be surrounded by 3-4 sperms; the fertilization should be finished within 1.5 hour.

(8) Incubating and growing the fertilized eggs of (7) according to normal cultivation methods; the breeding scallops with orange-red adductor muscles can be commercially used for breeding seeds.

In this example, the comparison between the breeding Yesso population and the wild population (22 month-old scallops are chosen from both for comparison) are summarized in Table 1 (growing property) and Table 2 (stress tolerance). The results showed the breeding population with orange-red adductor muscles had better growing property (high growth rate) comparing to the wild population with white adductor muscles; moreover, the breeding population had higher survival rate, indicated the better stress tolerance.

TABLE 1

The comparison of growing property between the breeding *P. yessoensis* population (testing group, n = 30) with orange-red adductor muscles and wild *P. yessoensis* population (wild control group, n = 30) with white adductor muscles.

| Growing property | Breeding group | Wild Control group |
|---|---|---|
| Total weight (g) ** | 110.338 ± 14.025 | 89.327 ± 15.041 |
| Total tissue weight (g) ** | 52.627 ± 7.134 | 40.682 ± 10.518 |
| Adductor muscle weight (g) ** | 11.104 ± 1.712 | 7.504 ± 1.479 |
| Shell Height | 90.9 ± 5.0 | 88.3 ± 6.103 |
| Shell Length* | 90.8 ± 8.1 | 87.3 ± 5.330 |
| Shell width | 24.5 ± 4.4 | 23.0 ± 3.2 |
| Tissue weight percentage (%) | 47.81 ± 3.71 | 44.97 ± 8.88 |
| Adductor muscle weight percentage (%) | 8.62 ± 1.41 | 8.45 ± 1.34 |

*P < 0.05 obvious difference,
** P < 0.01 significant difference, comparing with wild control, results are represented as the mean ± SD

TABLE 2

The comparison of stress tolerance between the breeding *P. yessoensis* population(testing group) with orange-red adductor muscles and wild *P. yessoensis* population (wild control group) with white adductor muscles.

| Stress tolerant property | Breeding group | Wild Control group |
|---|---|---|
| Survival rate of breeding seeds (survival No. of breeding pools/Total No. of breeding pools) | 30/30 | 19/30 |
| Survival rate of growing adults (average survival No. per raft/average initial No. per raft) | 13/15 | 9/15 |
| Total survival rate after birth (%) | 96% | 60% |

In summary, this invention has been described by reference to the above preferred example. However, it may be embodied in other specific forms or variations thereof without departing from its special or essential characteristics. The example described above is therefore considers to be illustrative in all respects and not restrictive, the scope of the invention being indicated by the relative claims rather than by the foregoing description.

What is claimed is:

1. A method for breeding scallop population with orange-red adductor muscles, wherein the method comprises:

(1) randomly collecting adult scallops from wild scallop populations; slightly opening shells of the adult scallops, observing colors of adductor muscles in the shells; selecting and growing scallops that have orange-red adductor muscles; separating male and female scallops; promoting selected scallops to sexual maturity;

(2) using high performance liquid chromatography (HPLC) technique to detect carotenoid contents in the orange-red adductor muscles of the selected scallops from (1); selecting the male and female scallops with above 15 μg/g carotenoid contents as parental seeds;

3) repeating the steps of (1) and (2) for four generations until 100% of breeding scallops have stable carotenoid contents and an average carotenoid content of two year old scallops is above 30 μg/g;

(4) then collecting scallops with orange-red adductor muscles from cultivated scallop populations or wild scallop populations; opening shells of the scallops and observing appearance of sex glands; selecting scallops with well developed sex glands as breeding parents;

(5) putting the selected scallops of (4) in indoor culturing pools with filtered sea water; washing shells of the parental seeds to remove additive mud and other materials; gradually and slowly increasing culturing temperature with less than 1° C. increase every day until the culturing temperature is 8-8.5° C. higher than environmental sea water temperature; culturing the scallops for additional 20 days to induce sexual maturity;

(6) separating males and females of sexually matured breeding parents from (5); drying the scallop in dark for 30-40 minutes; inducing the breeding parents to spawn eggs and sperms using warmer filter sea water which is 2° C. higher than the culturing sea water temperature of (5); separately collecting the eggs and sperms;

(7) mixing the eggs with the sperms; observing fertilized eggs under a microscope, each egg being surrounded by 3-4 sperms; and fertilization being finished within 1.5 hour; and (8) incubating and growing the fertilized eggs of (7) according to normal cultivation methods.

* * * * *